United States Patent
Wakefield

(10) Patent No.: US 7,275,781 B2
(45) Date of Patent: Oct. 2, 2007

(54) FLUID FORMING OF ORIENTED THERMOPLASTICS

(75) Inventor: Earlby Wakefield, Guelph (CA)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 11/288,999

(22) Filed: Nov. 29, 2005

(65) Prior Publication Data

US 2006/0113805 A1 Jun. 1, 2006

Related U.S. Application Data

(60) Provisional application No. 60/631,797, filed on Nov. 29, 2004.

(51) Int. Cl.
B62D 25/06 (2006.01)
(52) U.S. Cl. ................................... 296/102
(58) Field of Classification Search ........... 296/102
See application file for complete search history.

(56) References Cited

U.S. PATENT DOCUMENTS

| | | | |
|---|---|---|---|
| 4,323,535 A * | 4/1982 | Aston et al. ................ 264/528 |
| 5,169,587 A | 12/1992 | Courval |
| 5,169,589 A | 12/1992 | Francoeur et al. |
| 5,204,045 A | 4/1993 | Courval et al. |
| 5,411,805 A | 5/1995 | Magill |
| 5,557,961 A * | 9/1996 | Ni et al. .................... 29/421.1 |
| 6,032,501 A * | 3/2000 | Bihrer ............................ 72/58 |
| 6,067,831 A * | 5/2000 | Amborn et al. ............ 29/421.1 |
| 6,104,012 A * | 8/2000 | Durand ........................ 219/617 |
| 6,132,668 A | 10/2000 | Baars et al. |
| 6,514,597 B1 | 2/2003 | Strobel et al. |
| 6,631,630 B1 | 10/2003 | Pourboghrat et al. |
| 6,732,434 B2 * | 5/2004 | Luo et al. .................... 29/897.2 |
| 6,926,350 B2 * | 8/2005 | Gabbianelli et al. ... 296/203.01 |
| 7,021,658 B2 * | 4/2006 | Kleinhoffer et al. ........ 296/102 |
| 2002/0163173 A1 * | 11/2002 | Ruehl et al. ................. 280/781 |
| 2003/0052516 A1 * | 3/2003 | Czaplicki et al. ............ 296/188 |
| 2004/0036317 A1 * | 2/2004 | Kleino ..................... 296/146.6 |
| 2004/0084141 A1 * | 5/2004 | Czaplicki ..................... 156/294 |
| 2004/0094975 A1 * | 5/2004 | Shuler et al. ................ 293/120 |
| 2004/0096610 A1 * | 5/2004 | Ramanathan et al. ...... 428/35.7 |
| 2004/0207233 A1 * | 10/2004 | Bock et al. ............ 296/187.02 |
| 2004/0255463 A1 * | 12/2004 | Kiehl ........................ 29/421.1 |
| 2005/0253403 A1 * | 11/2005 | Longo ........................ 293/133 |
| 2005/0285414 A1 * | 12/2005 | Liu et al. .................... 293/102 |
| 2006/0021697 A1 * | 2/2006 | Riley et al. ................. 156/295 |
| 2006/0032895 A1 * | 2/2006 | Durand et al. ............ 228/234.1 |
| 2006/0049650 A1 * | 3/2006 | Evans ........................ 293/120 |
| 2006/0061080 A1 * | 3/2006 | Luttinen et al. ............ 280/784 |
| 2006/0096099 A1 * | 5/2006 | Cripsey et al. ............. 293/102 |

\* cited by examiner

*Primary Examiner*—Kiran B. Patel
(74) *Attorney, Agent, or Firm*—Clark Hill PLC

(57) ABSTRACT

The invention provides a method of forming structural components for automotive vehicles from elongated tubular blanks. A longitudinally oriented tubular blank comprised of a thermoplastic material is provided. The tubular blank is fluidformed in a fluid forming cavity by orienting in a hoop direction of the tubular blank to conform the tubular blank to a predetermined shape of the fluid forming cavity to provide structural components having increased strength over the tubular blank. The structural components have biaxial and/or triaxial orientation. Fluid forming is performed within an orientation temperature range above the glass transition temperature and below the softening point of the thermoplastic material. Structural components include bumper beams, intrusion beams in vehicle doors, crush cans, and frame members. The produced structural components are strong and light weight.

1 Claim, 7 Drawing Sheets

FLUID FORMING OF ORIENTED THERMOPLASTICS

CROSS-REFERENCE TO RELATED APPLICATIONS

This applications claims priority of U.S. Provisional Application No. 60/631,797 filed on Nov. 29, 2004, entitled "Fluid Forming of Oriented Thermoplastics" which is incorporated herein by reference for all purposes.

FIELD OF THE INVENTION

The present invention generally relates to the field of fluid forming and in particular to the fluid forming of oriented thermoplastics.

BACKGROUND OF THE INVENTION

The present invention relates to fluid forming. In the present specification, the term fluid forming relates to the general process of deforming a material, usually in the form of a tubular blank, by the application of fluid pressure. The fluid may be a liquid, a gas or a fluidized solid, e.g. solid particles which collectively act as a fluid.

Hydroforming is a commonly used fluid forming process using water as a pressurized fluid. It is a well known prior art metal working process that uses a pressurized fluid to expand a closed channel work piece outwardly into conformance with a die cavity. For example, a metal tube may be hydroformed to a desired tubular shape. The metal tube is placed between a pair of dies having cavities which define the desired resultant shape of the tube. The ends of the tube are accessible through the die and a seal is connected to the ends of the tube so that pressurized fluid injected into the tube forces the tube to expand and conform to the shape defined by the die cavity.

The result of the hydroforming process is essentially to deform or "blow up" the tube so that it conforms to the inner surface of the mold or tool. Some limitations on the use of hydroforming are present, since the material forming the tube can be stretched or deformed only in accordance with respective material limits. Furthermore, assuming that a tubular member to be hydroformed has an approximately constant thickness, it will be stretched or deformed evenly over its entire surface area. Thus, hydroformed elements have certain advantageous strength characteristics.

Polymers, by definition, are long chain molecules in which the atoms are bound to one another by means of strong covalent bonds. Hence one would expect exceptionally high strength and stiffness values in the chain direction since the applied load would then be opposed by the covalent bonds themselves. On the contrary, most of the commercial polymers exhibit strength and stiffness values far below their theoretical limits. It is established that the modulus values of most of the commercial polymers are at least an order of magnitude less than their theoretical limits, thus severely limiting their use in many structural or load bearing applications. One of the many ways to improve engineering properties lies in the preparation of oriented polymers.

The need for oriented polymers has led to the development of several orientation techniques. Conventionally, three types of molecular orientation can be introduced into any isotropic polymeric system. One type of molecular orientation is a uniaxial orientation with a preferential alignment of the polymer molecules along the direction of application of deformation force. Typical processes which lead to uniaxial orientation are cold drawing and cold extrusion. Another type of molecular orientation is a biaxial orientation. In this case, the polymer molecules are preferentially aligned along two different deformation directions usually perpendicular to one another. Film blowing processes have been normally used to create biaxial orientation. A third type of molecular orientation is triaxial orientation. When a uniaxially oriented polymer is rolled under suitable conditions, one of the crystallographic planes usually lies parallel to the molecular axis and becomes oriented within the plane of rolling, yielding a triaxially oriented polymer. U.S. Pat. No. 5,411,805 to Magill, for example, discloses triaxially oriented polymer membranes or thin films produced by a rolltrusion process.

Biaxially oriented polyolefin films, such as, for example, biaxially oriented polypropylene films (BOPP films), are widely used as films for packaging, since they are excellent in moisture properties, strength, clarity, and surface gloss. They are generally made by a method comprising solid state orientation. The majority of commercially available biaxially oriented polypropylene films are produced by the flat film or tenter stretching process. Stretching to orient a thermoplastic material is widely utilized within the art since it is well known that an oriented material exhibits increased tear resistance in the direction transverse to the direction of stretching and orientation.

The use of oriented films is widespread, particularly with films comprised of semi-crystalline thermoplastic polymers. These oriented films are characterized by high tensile strength and low to moderate elongation. Orientation can also influence crystalline order and hence the melting or softening point of an oriented polymer. Examples of oriented films are disclosed in U.S. Pat. No. 6,514,597 to Strobel et al. disclosing embossed oriented thermoplastic films and U.S. Pat. No. 6,132,668 to Baars et al. disclosing the formation of thick films having a biaxial molecular orientation.

U.S. Pat. No. 6,631,630 issued to Pourboghrat et al. discloses an apparatus and a method for hydroforming materials such as sheet metal or composite sheets of thermosetting or thermoplastic polymers. In particular, Pourboghrat et al. disclose an apparatus and a method for shaping complex structures using composite sheets such as continuous-fiber or woven fiber composites with limited wrinkling or rupture of the composite sheets during the shaping process. The hydroforming process and apparatus disclosed by Pourboghrat et al. describes the hydroforming of sheet structures over a punch die using a pressurized fluid as a counter "die" to form a hydroforming cavity. As the die punch travels into the sheet blank, the blank begins to deform into a hemispherical shape initially and finally into a fully formed part. Nonetheless, Pourboghrat et al. do not describe a hydroforming process of more complex structures such as tubular structures.

U.S. Pat. No. 5,169,587 to Courval, U.S. Pat. No. 5,169,589 to Francoeur et al., and U.S. Pat. No. 5,204,045 to Courval et al. disclose processes for ram extruding unmelted thermoplastic polymers into highly oriented rods of enormous strength. The processes generally require two steps. First, the thermoplastic polymer is extruded conventionally into semi-crystalline polymer billets which can have a variety of profiles, such as solid, round, or rectangular profiles. The billets are then heated to slightly below the melting point and are ram extruded with a very high draw ratio into thin, oriented polymer profiles. A haul off stress between at least 0.5 Mpa and a maximum amount without plastic deformation of the extrudate keeps the profiles from relaxing before they cool.

However, it is desirable to produce stronger polymers that have more complex structures. Thus, it is desirable to produce biaxially and/or triaxially oriented thermoplastic materials by means of a fluid forming process. Fluid forming can yield more complex structures, such as strong tubular structures for use in automotive vehicle doors and frames or energy-absorbing structures.

Hydroforming for shaping metals has been shown to have important advantages over other metal shaping processes, such as reduced tooling cost, increased drawability, and formation of components with greater dimensional stability. It is desirable to produce thermoplastic materials with similar advantages using a fluid forming process.

SUMMARY OF THE INVENTION

In accordance with the invention there is provided, a method of forming structural components for automotive vehicles from elongated tubular blanks, the method comprising the steps of: providing a tubular blank comprised of a thermoplastic material, the thermoplastic material being oriented in a longitudinal direction of the tubular blank, placing the tubular blank into a cavity of a die mold, the die mold having an interior surface defining a shape of the cavity, providing a fluid interiorly to the tubular blank with sufficient pressure so as to expand the tubular blank outwardly into engagement with the interior surface of the die mold to substantially conform the tubular blank to the shape of the cavity and so as to orient the thermoplastic material of the tubular blank in a hoop direction of the tubular blank.

In accordance with an aspect of the invention, the thermoplastic material of the structural components is biaxially and/or triaxially oriented.

In accordance with another aspect of the invention, the step of providing a fluid is performed within an orientation temperature range. The orientation temperature range is a range above the glass transition temperature and below the softening point of the thermoplastic material.

In accordance with a further aspect of the invention, the thermoplastic material contains a reinforcement material. The reinforcement material can be one or more of the following: a pigment, fumed silica, calcium carbonate, talc, diatomaceous earth, titanium dioxide, carbon fibers, carbon black, carbon nanotube, Buckminster fullerene, glass beads, glass bubbles, mineral fibers, glass fibers, nano-sized fibers or fillers, Kevlar™, polypropylene fibers, mica, clay particles, and metal particles and the like.

In accordance with an embodiment of the invention, the step of providing a fluid is performed by using one of an incompressible fluid and a compressible fluid. Advantageously, water is used as an incompressible fluid.

In accordance with another aspect of the invention, the strength increase by means orienting in a hoop direction is proportional to a degree of stretching of the thermoplastic material.

In accordance with another aspect of the invention, a strain rate during the step of providing a fluid is selected so as to maintain a ductility of the thermoplastic material.

In accordance with yet another embodiment of the invention, the thermoplastic material comprises an orientable thermoplastic. The orientable thermoplastic material comprises one or more of a polyolefin, polystyrene, polyester, polyvinyl chloride, nylon, and poly(methyl methacrylate). Advantageously, polypropylene is used as a polyolefin.

In accordance with another aspect of the invention, there is provided a structural frame member for use in a vehicle made by the method of the instant invention.

In accordance with yet another aspect of the invention, there is provided an energy management structure for use in a vehicle made by the method of the instant invention.

In accordance with a further aspect of the invention there is provided a structural component for use in vehicles comprising: a hollow thermoplastic component comprising a thermoplastic material having at least one of a biaxial and a triaxial orientation, the hollow thermoplastic component being formed from a thermoplastic tube having an orientation in a longitudinal direction of the thermoplastic tube.

In accordance with yet a further aspect of the invention, there is provided a structural component for use as an energy-absorbing component and/or a frame component.

In accordance with another aspect of the invention, there is provided an energy-absorbing structure for use in a vehicle comprising: a hollow oriented thermoplastic tube, said oriented thermoplastic tube having at least one of a biaxial and triaxial orientation.

In accordance with yet a further aspect of the invention, there is provided a bumper assembly for use on a vehicle comprising: a longitudinal bumper bar formed from oriented thermoplastic tubing, said oriented thermoplastic tubing having at least one of a biaxial and triaxial orientation.

In accordance with yet a further aspect of the invention, there is provided a structural frame member for use in a vehicle comprising: a hollow oriented thermoplastic tube, said oriented thermoplastic tube having at least one of a biaxial and triaxial orientation.

In accordance with the invention there is provided, a method of forming structural components for automotive vehicles from elongated tubular blanks, the method comprising the steps of providing a longitudinally oriented tubular blank comprised of a thermoplastic material, and fluid forming the tubular blank in a fluid forming cavity by orienting in a hoop direction of the tubular blank for conforming the tubular blank to a predetermined shape of the fluid forming cavity to provide structural components having increased strength over the tubular blank.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

Figure 1:
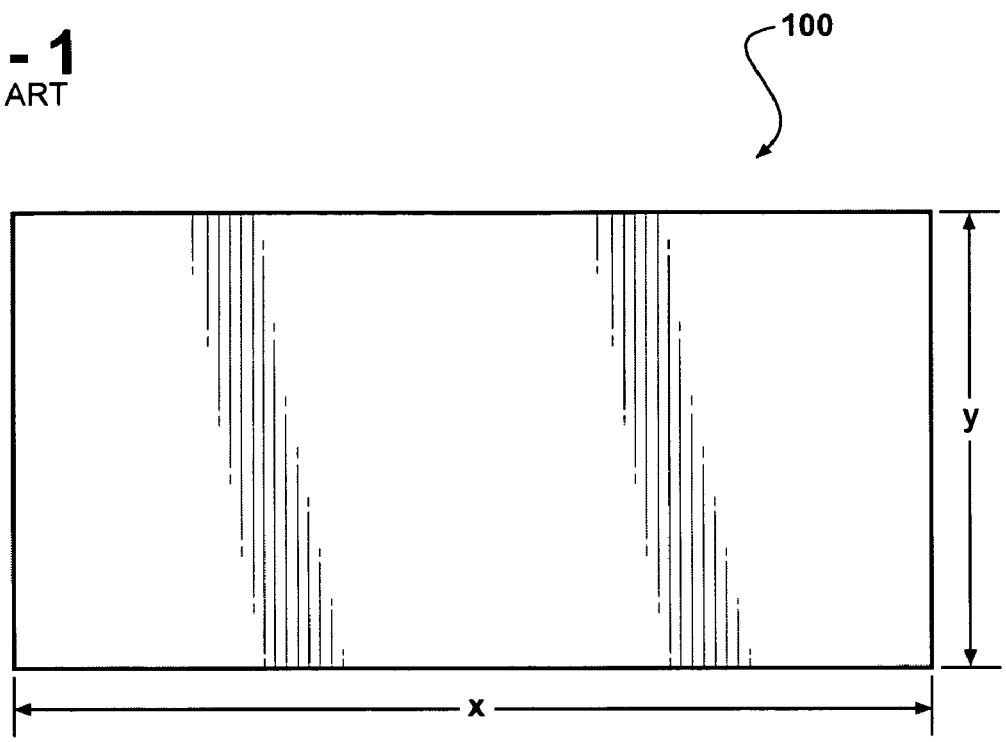
FIG. 1 shows a schematic presentation of a prior art biaxially oriented polypropylene film.

The invention provides structural components for automotive vehicles formed from elongated tubular blanks. The tubular blanks are made of a thermoplastic material that is oriented in a longitudinal direction of the tubular blank. In accordance with the invention, a tubular blank is then placed into a cavity of a die mold having an interior surface defining a shape of the cavity. A fluid is provided to the interior of the tubular blank with sufficient pressure so as to expand the tubular blank outwardly into engagement with the interior surface of the die mold to conform the tubular blank to the shape of the cavity. During this step, the thermoplastic material of the tubular blank becomes oriented in a hoop direction of the tubular blank. As a result, the thermoplastic material of the structural components is biaxially and/or triaxially oriented.

The terms "oriented" and/or "orientation" are used herein to describe the process and resultant product characteristics obtained by fluid forming an orientable polymeric thermoplastic material which has been heated to within its orientation temperature range and then cooled in order to lock-in or "freeze" the molecular alignment of the material in the direction of stretching and/or fluid forming. The polymer molecules are aligned parallel to the draw direction. A material, like polyethylene, for example, can be stretched and/or fluidformed to many times its original dimensions at room temperature. This action improves the mechanical properties of the fluidformed structure by conferring increased strength and modulus in the stretching and/or fluid forming direction. The orientation temperature range for a given tubular blank will vary with the different thermoplastic materials or blends thereof which comprise the tubular blank. However, the orientation temperature range may generally be stated to be above the glass transition temperature and below the softening point of the thermoplastic material or blend of materials which comprise the tubular blank. The glass transition temperature $T_g$ is the temperature at which a polymer changes from hard and brittle to soft and pliable. The orientation temperature is chosen to be below the softening point of the thermoplastic material so as to avoid a relaxation of the polymer. Orientation temperature ranges for the materials encompassed by the present invention are well known to those skilled in the art. When the stretching force is applied in one direction uniaxial orientation results. The polymer molecules are aligned along the direction of application of deformation force. Examples of processes leading to uniaxial orientation are cold drawing and cold extrusion. When the stretching force is applied in two directions biaxial orientation results. The polymer molecules are aligned along two different deformation directions, usually perpendicular to one another. Examples of processes leading to biaxial orientation are film blowing processes. When the stretching force is applied in three directions triaxial orientation results. The polymer molecules are aligned along three different deformation directions. For example, when a uniaxially oriented polymer is rolled under suitable conditions, one of the crystallographic planes usually lies parallel to the molecular axis and becomes oriented within the plane of rolling. In accordance with the present invention, some degree of triaxial orientation results when longitudinally oriented polymeric tubular blanks are fluidformed. The fluid forming applies stretching forces in two further deformation directions. Depending on the desired shape of the fluidformed structural components, the degree of stretching in the second and third deformation direction during the fluid forming may vary so that the structural components may have varying degrees of biaxial and/or triaxial orientation.

Furthermore, it is desirable to select the fluid forming conditions such that the thermoplastic material remains ductile. For example, as the strain rate increases, the thermoplastic material becomes more brittle. Thus, the strain rate during the fluid forming step is chosen so as to maintain a ductility of the thermoplastic material.

The term "thermoplastic" and/or "thermoplastic material" is used herein to describe a material that softens when heated and hardens again when cooled or a material having the property of softening or fusing when heated and of hardening and becoming rigid again when cooled. Examples of thermoplastics are polyolefins, polyethylene, polystyrene, polypropylene, PVC, saturated polyesters and Nylon. In accordance with the present invention, any thermoplastic polymer that can be oriented can be used to form structural components. The structural components made in accordance with the instant invention can be made from a thermoplastic material containing a single thermoplastic or a mixture of two or more thermoplastics.

The oriented thermoplastic materials useful in this invention may contain fillers, plasticizers, colorants, lubricants, processing aids, nucleating agents, ultraviolet-light stabilizing agents, and other property modifiers. Typically such materials are added to a polymer before it is made into an oriented structure (e.g., in the polymer melt before the formation of the tubular blank and before the tubular blank is fluidformed). Organic fillers may include organic dyes and resins, as well as organic fibers such as nylon and polyimide fibers. Inorganic fillers and/or fiber reinforcements may include pigments, fumed silica, calcium carbonate, talc, diatomaceous earth, titanium dioxide, carbon fibers, carbon black, carbon nanotubes, Buckminster fullerenes, glass beads, glass bubbles, mineral fibers, glass fibers, Kevlar™, carbon fibers, polypropylene fibers, mica, clay particles, metal particles and the like. Furthermore, in accordance with the instant invention, the thermoplastic material may further include nanocomposites, such as polymers containing nano-sized filler particles and/or nano-sized fibers. Other additives such as flame retardants, stabilizers, antioxidants, compatibilizers, antimicrobial agents (e.g., zinc oxide), electrical conductors, and thermal conductors (e.g., aluminum oxide, boron nitride, aluminum nitride, and nickel particles) can also be blended into the polymer. However, the invention is not intended to be limited to the specific examples presented above, and it is to be understood that the above materials are exemplary materials. A person skilled in the art will become aware of other materials which could be used also.

In accordance with an embodiment of the invention, the fluids employed in the fluid forming step can be either compressible fluids, such as gases, or incompressible fluids, such as water or sea sand. In accordance with a preferred embodiment of the instant invention an incompressible fluid is employed. Compressible fluids are more challenging in achieving the high pressures necessary for fluid forming.

In accordance with yet another embodiment of the present invention, water is the most preferred fluid for fluid forming. If water is employed as a fluid, the fluid forming step is called hydroforming.

Turning now to FIG. 1, a schematic presentation of a prior art biaxially oriented polypropylene film 100 is shown having an orientation in a longitudinal direction, x, and a transverse direction, y. In the biaxial orientation of polypropylene film by the tenter method, for example, consecutive stretching is usually used. In this process, the thermoplastic material is first melted in an extruder, shaped into a preliminary film in a die and cooled on one or more rolls. The unstretched film is then longitudinally (x) and transversely (y) stretched in succession, the longitudinal stretching usually being affected before the transverse stretching. After the transverse stretching the film is heat-set, cooled.

Figure 2A:
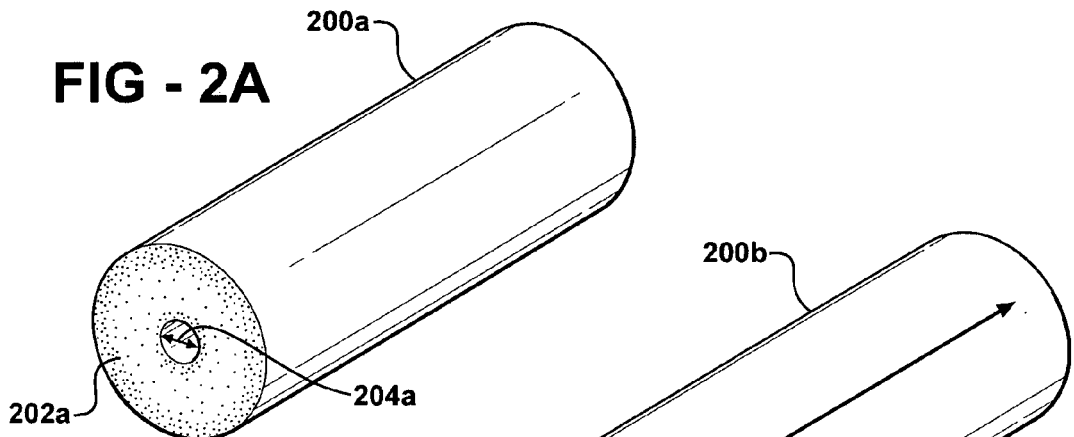
FIG. 2a shows a perspective view of a tubular blank.
Figure 2B:
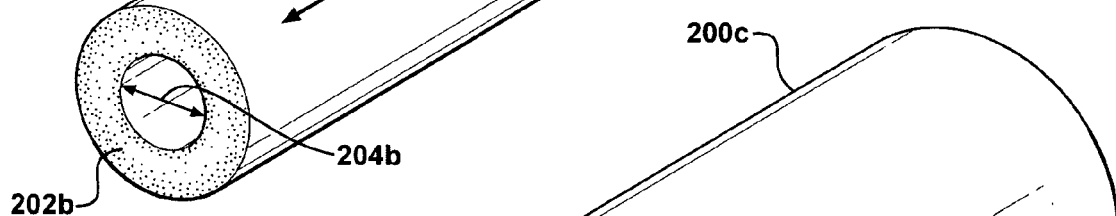
FIG. 2b shows a perspective view of a longitudinally oriented tubular blank.
Figure 2C:
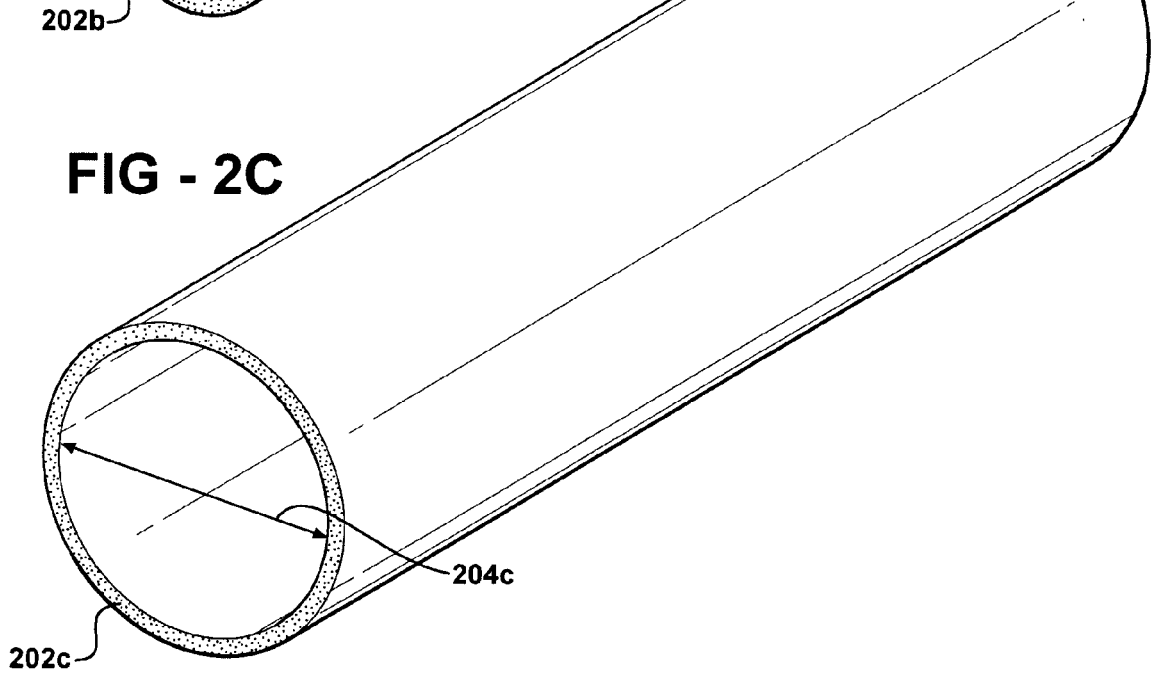
FIG. 2c shows a perspective view of a biaxially and/or triaxially oriented fluidformed tube.

FIG. 2a shows a perspective view of a tube 200a made of a thermoplastic material. Tube 200a is stretched in a longitudinal direction, such as in an extrusion process for example, to yield tube 200b of FIG. 2b. The longitudinal stretching is indicated in FIG. 2b by double arrow P. During the longitudinal stretching, the thermoplastic polymer of tube 200b becomes oriented in one direction as the chains of the polymer are aligned along the direction of application of deformation force and the thermoplastic material attains strength in the longitudinal or length direction. During this process, tube 200b is stretched in accordance with the stretching factor of its respective thermoplastic material. For example, polypropylene can be stretched to about five times its length. FIG. 2c shows a perspective view of a fluidformed tube 200c to create strength around tube 200c through a biaxial and/or triaxial orientation of the shaped product. Fluidformed tube 200c is obtained by sealing the tube at both ends and applying a high pressure by injecting a pressurized fluid to expand the circumference of tube 200c. During the fluid forming process, tube 200c can be stretched in accordance with the stretching factor of the respective thermoplastic material used for the preparation of tube 200c.

During the longitudinal stretching process, the area of the annulus 202a of unstretched tube 200a is approximately the same as the area of the annulus 202b of stretched tube 200b. However, the internal diameter 204a of tube 200a is smaller than the internal diameter 204b of tube 200b. Similarly, during the fluid forming process, the area of the annulus 202a of unstretched tube 200a and the area of the annulus 202b of stretched tube 200b are approximately the same as the area of the annulus 202c of fluidformed tube 200c. However, the internal diameter 204c of fluidformed tube 200c is larger than the internal diameters 204b and 204a of tubes 200b and 200a, respectively.

Thus, in accordance with the invention, structural components, such as frame components and/or energy management components for automotive applications, can be formed from tubular blanks by providing a longitudinally oriented tubular blank made of a thermoplastic material. The longitudinal orientation of the tubular blank imparts an increased strength to the thermoplastic material. The strength increase is observed in a longitudinal direction of the tubular blank. During the fluid forming step, the tubular blank is further oriented in a fluid forming cavity by orienting the tubular blank in a hoop direction. In the context of this specification, orienting the tubular blank in a hoop direction means an expansion of a circumference of a section cut transverse to the direction of longitudinal orientation of the tubular blank. The fluid pressure is applied until the tubular blank conforms to the fluid forming cavity. The orientation in the hoop direction of the tubular blank increases the strength of the formed structural products in the hoop direction. Orientation of the tubular blank in the hoop direction orients at least some of the molecules of the thermoplastic polymer in the hoop direction thereby gaining biaxially and/or triaxially oriented products of increased strength and modulus.

Advantageously, the polymer molecules of the thermoplastic material become biaxially and/or triaxially oriented during the fluid forming process. The biaxial and/or triaxial orientation creates stronger thermoplastic materials which can potentially replace metallic materials. As discussed heretofore, biaxially and/or triaxially oriented thermoplastic products in accordance with the invention may be used in automotive applications as structural components, such as frame components and/or energy management components, for example in crash buffers, or in doors and frames. Thus, fluid forming of thermoplastic materials creates strong and light weight structural products using a process that is similar to the forming of metal tubes.

Turning now to FIGS. 3a-3c, 4a-4c, and 5a-5c, examples are provided for the fluid forming of longitudinally oriented tubular blanks made of thermoplastic materials to yield strong and light weight structural components.

Figure 3A:
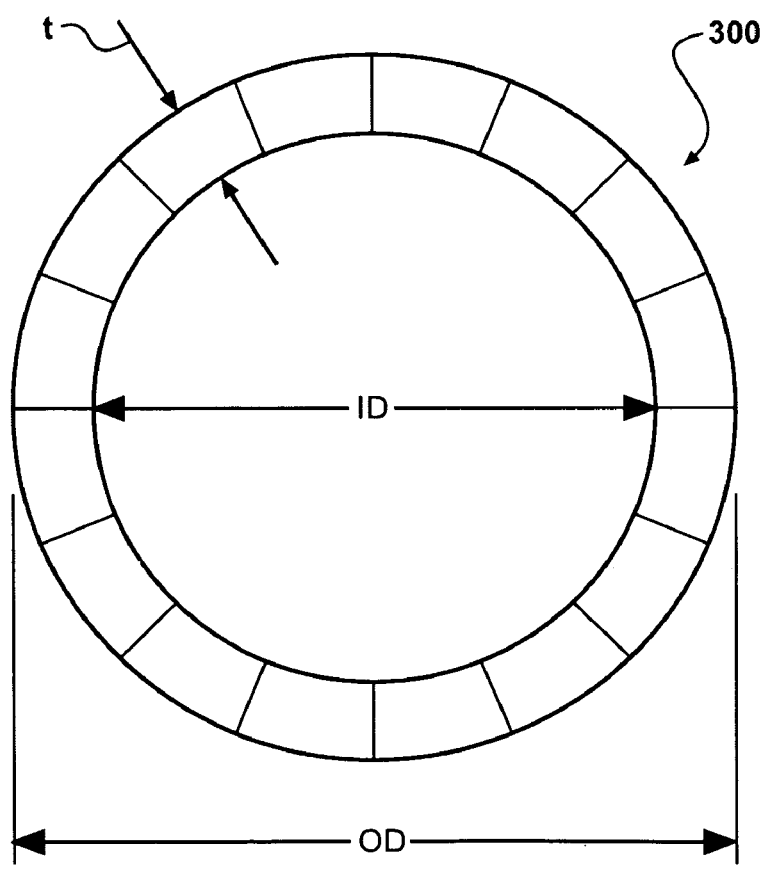
FIG. 3a shows a cross-sectional view of a tubular blank.

FIG. 3a shows a cross-sectional view of a tubular blank 300. The tubular blank 300 has an internal diameter designated with "ID", an outside diameter designated with "OD", a wall thickness designated with "t", and an area of the annulus designated with "$A_{annulus}$".

Figure 3B:
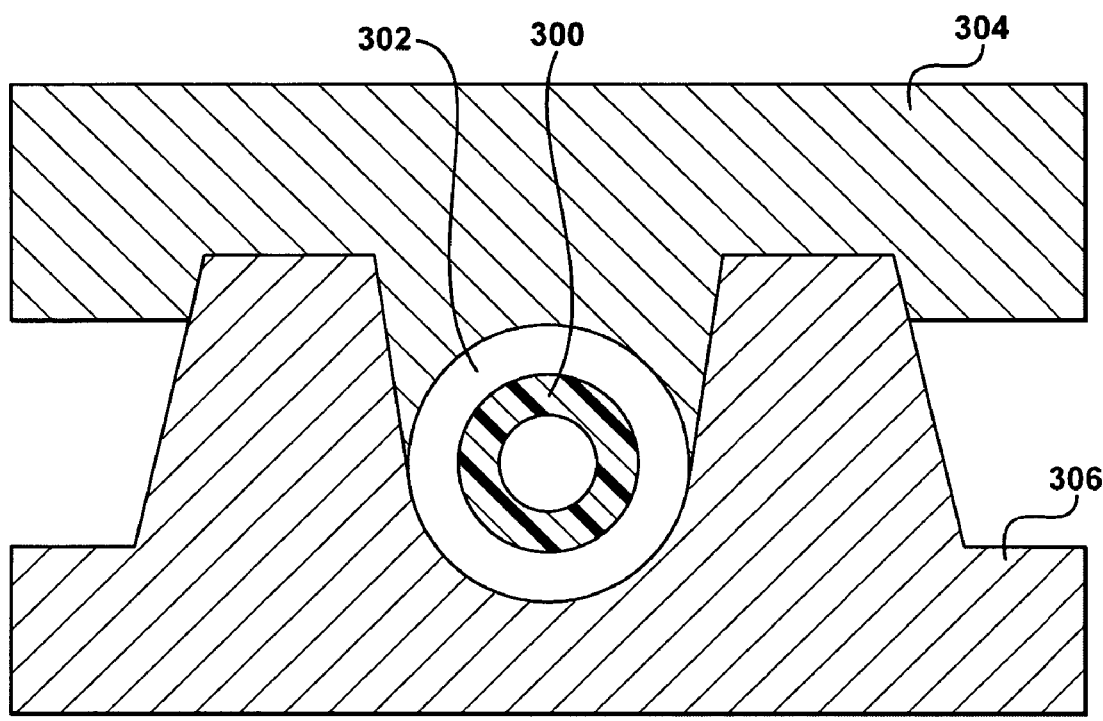
FIG. 3b shows a cross-sectional view of the tubular blank of FIG. 3a disposed in a forming cavity between an upper fluidforming die and a lower fluidforming die.
Figure 3C:
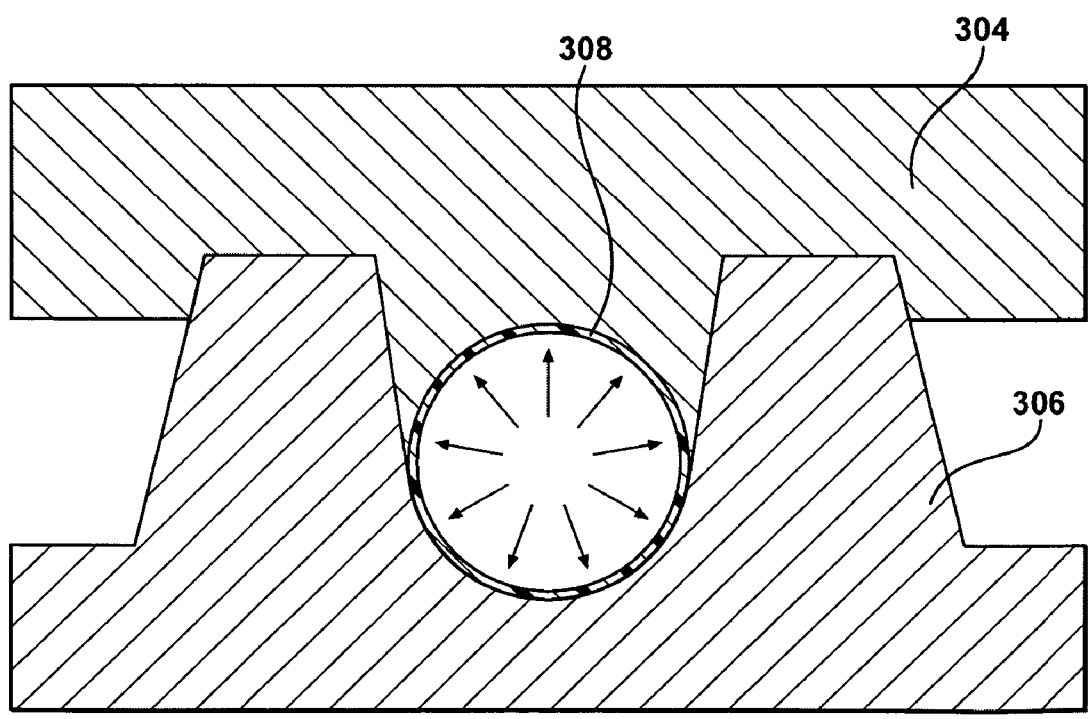
FIG. 3c shows a cross-sectional view of a fluidformed product in the forming cavity.

Turning now to FIG. 3b, it is seen that the tubular blank 300 is disposed in a forming cavity 302 formed between an upper fluid forming die 304 and a lower fluid forming die 306. The forming cavity 302 extends longitudinally along the length of the die. The tubular blank 300 is heated to the orientation temperature of the plastic material that it is made of, either by heating the fluid forming fluid or the forming cavity or both. The ends of the tubular blank 300 are sealed and a fluid forming fluid is pumped into the tubular blank. The upper and the lower fluid forming dies 304, 306 are tightly closed and the pressure inside the tubular blank 300 is increased to expand the outside diameter of the tubular blank 300 to conform to the forming cavity 302, as shown in FIG. 3c. The pressure exerted by the fluid forming fluid inside the tubular blank is indicated by arrows in FIG. 3c. In accordance with the invention, the resulting fluidformed tube 308 is biaxially and/or triaxially oriented and has a larger outside diameter than the tubular blank 300 and correspondingly, the internal diameter of tubular blank 300 is also increased in the fluidformed tube 308. Furthermore, the wall thickness of the fluidformed tube 308 is smaller than the wall thickness of the tubular blank 300. However, the area of the annulus of the tubular blank 300 and the fluidformed tube 308 is approximately the same.

Figure 4A:
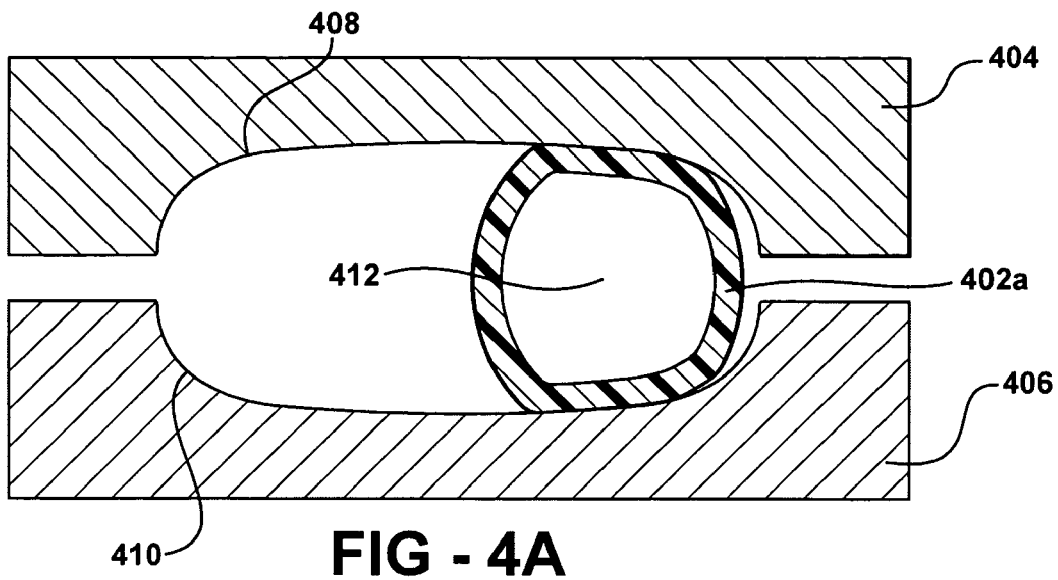
FIG. 4a shows a cross-sectional view of a tubular blank being placed in a die set comprised of an upper die and a lower die.
Figure 4B:
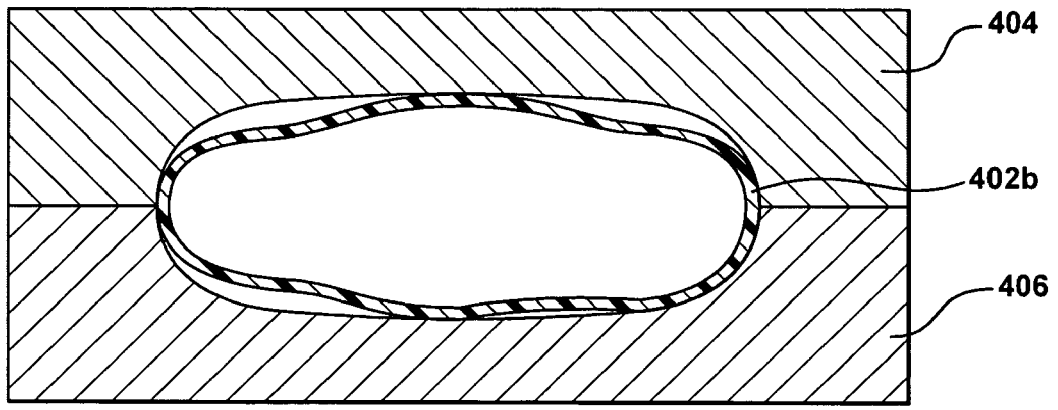
FIG. 4b shows a cross-sectional view of the tubular blank of FIG. 4a in the die set as the upper and the lower die are progressively closed.
Figure 4C:
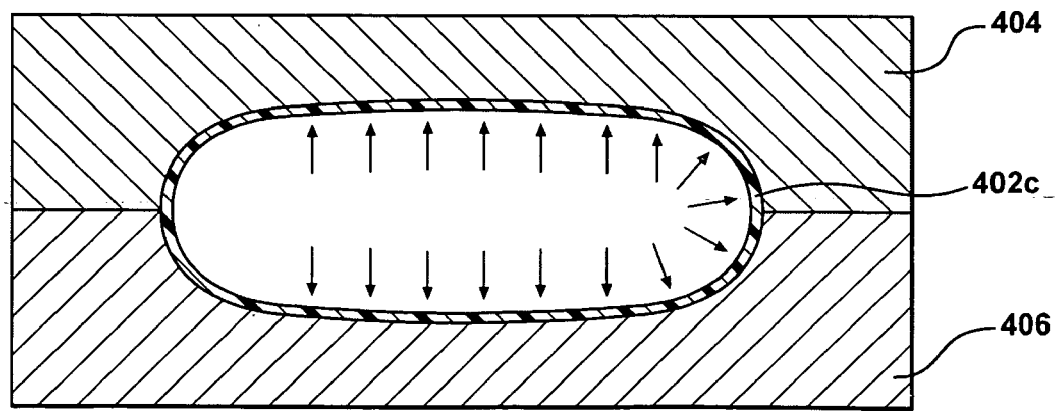
FIG. 4c shows a cross-sectional view of the tubular blank expanded to the final oval cross-sectional profile of the fluidformed product.

In accordance with another embodiment of the invention, the fluidformed product is a tube with an oval cross-section as shown in more detail in conjunction with FIGS. 4a-4c. As shown in FIG. 4a, a tubular blank 402a is placed in a die set comprised of an upper die 404 and a lower die 406. The upper die 404 includes a tubular forming cavity portion 408. Likewise, the lower die 406 includes a tubular forming cavity portion 410. It will be understood that the combined cross-sectional circumferential measure of the tubular forming cavity portions 408 and 410 are equal or greater than the cross-sectional perimeter length of the tubular blank 402a. The ends of the tubular blank are sealed and a fluid forming fluid is provided to the inside 412 of the tubular blank 402a. The upper and the lower die 404 and 406 are progressively closed as shown in FIG. 4b so that the tubular blank 402b is progressively flattened and the pressurized fluid captured therein expands the walls of the tubular blank into the cavities of the die. As seen in FIG. 4b, the upper and the lower die 404, 406 are fully closed upon one another with the tubular blank 402b being tightly clamped between the dies. Once the die is closed, the tubular blank 402b is then expanded to the final oval cross-sectional profile of FIG. 4c by heating the tubular blank to its orientation temperature and by increasing the pressure of the fluid forming fluid inside the tubular blank sufficiently so that the tubular blank is forced into conformity with the tubular forming cavity portions 408, 410 of the upper and the lower die 404, 406, respectively. Once the fluidformed product 402c reaches its final cross-sectional profile, the upper and the lower die are moved away from each other and the final fluidformed product having a biaxial and/or triaxial orientation is removed from the mold.

In accordance with the invention, the fluid forming mold/cavity can be designed to yield fluidformed biaxially and/or triaxially oriented thermoplastic structural components of various cross-sectional profiles.

Figure 5A:
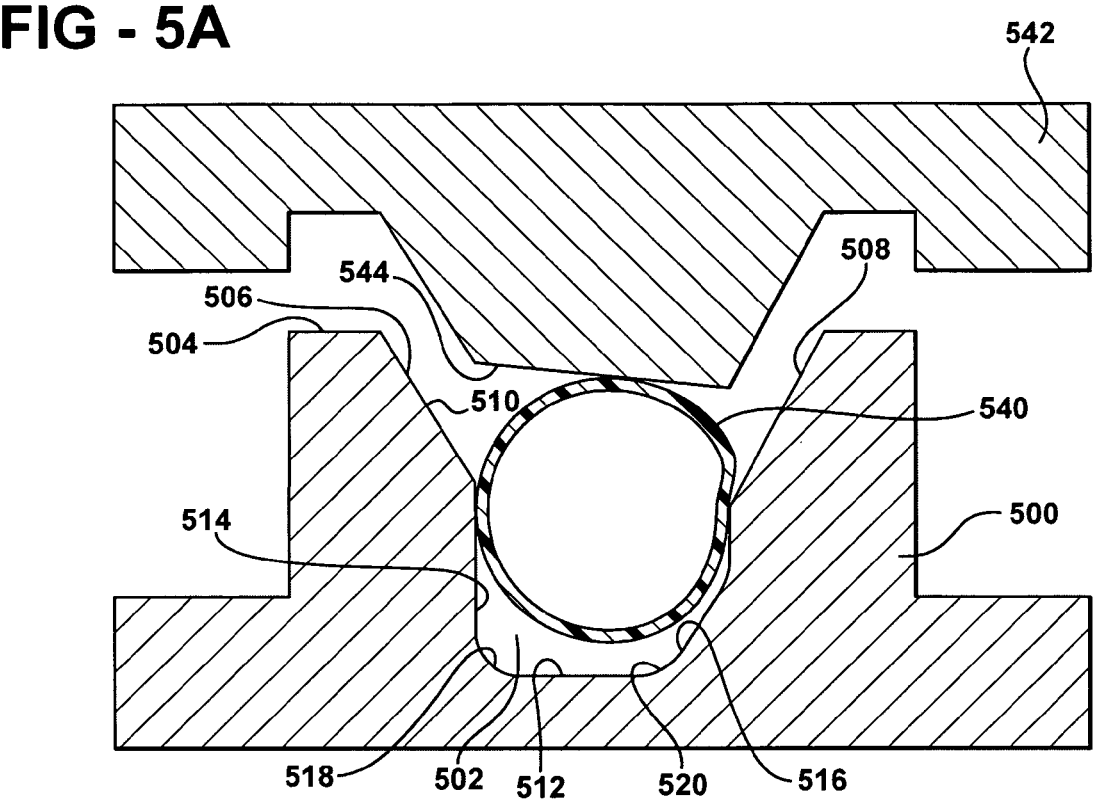
FIG. 5a shows a cross-sectional view of yet another tubular blank being placed in a die set comprised of an upper die and a lower die.
Figure 5B:
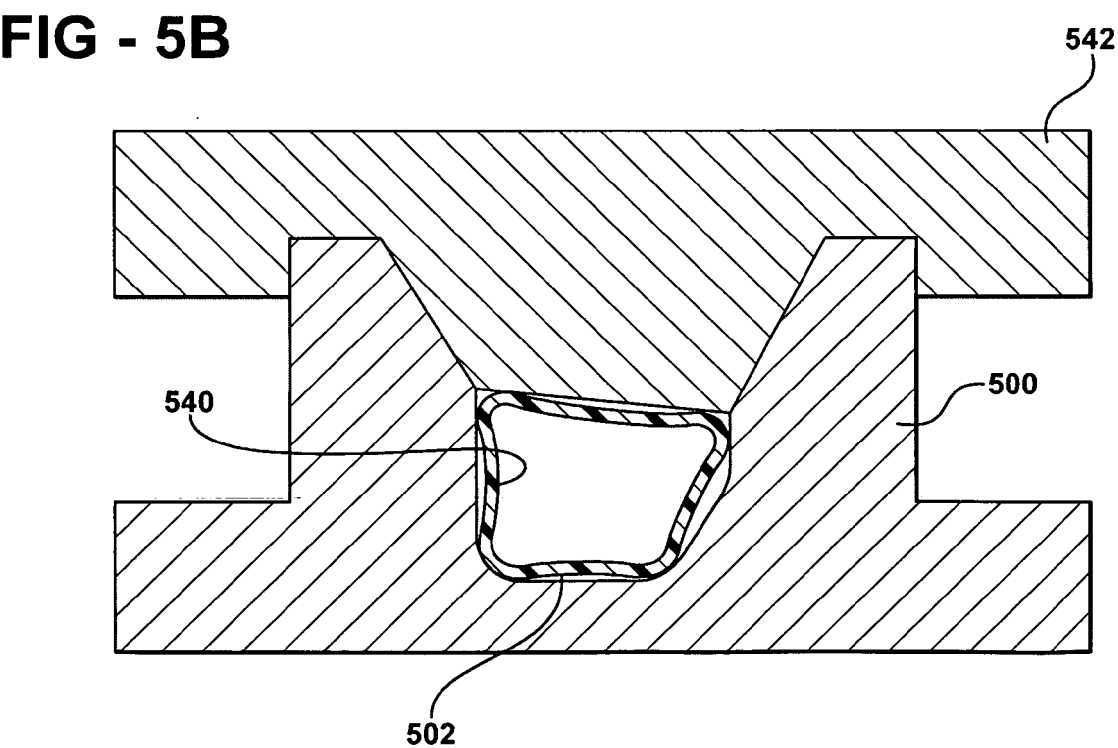
FIG. 5b shows a cross-sectional view of the upper die fully lowered upon the lower die so that the tubular blank has been completely forced into molding cavity.
Figure 5C:
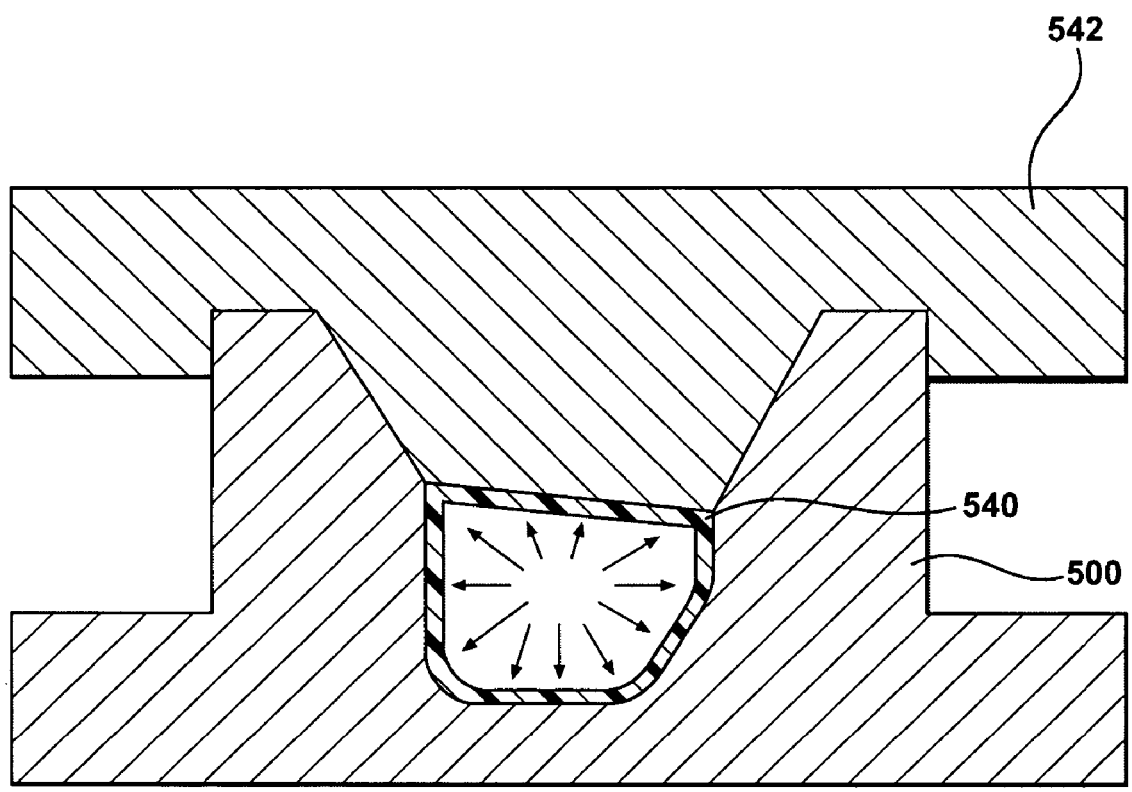
FIG. 5c shows a cross-sectional view of the tubular blank expanded to the final pentagonal cross-sectional profile of the hydroformed product.

FIGS. 5a-5c show cross-sectional representations of yet another fluid forming process for thermoplastic materials having a pentagonal cross-sectional profile of the final biaxially and/or triaxially oriented fluidformed tube. Referring now to FIG. 5a, it is seen that the lower fluid forming die 500 has forming cavity 502 which extends longitudinally along the length of the die 500 and is submerged within the die 500 below the top surface 504 of the die. The forming cavity 502 opens upwardly to the top surface 504 by angularly disposed funnel walls 506 and 508 defining an entry opening 510. The forming cavity 502 includes a bottom wall 512 and side walls 514 and 516. A concave rounded corner 518 smoothly joins the bottom wall 512 and side wall 514. Likewise, a concave rounded corner 520 smoothly joins the bottom wall 512 with the side wall 516. The side walls 514 and 516 are angled away from one another to facilitate the removal of a fluidformed tube from the die cavity 502.

FIG. 5a further shows a tubular blank 540 placed in the entry opening 510 of the lower die 500. Because the diameter "d" of the tubular blank 540 is greater than the width "w" of the forming cavity 502, the tubular blank 540 is forced into the forming cavity 502 by an upper die 542. As is seen from FIG. 5a, the upper die 542 is closed upon the lower die 500. The lid wall 544 of the upper die 542 has moved down into engagement with the top of the tubular blank 540 and forces the tubular blank 540 downwardly into the cavity 502.

FIG. 5b shows the upper die 542 fully lowered upon the lower die 500 so that the blank 540 has been completely forced into the lower cavity 502. The lid wall 544 of the upper die 542 cooperates with the bottom wall 512 and side walls 514 and 516 of the lower die 500 to define the box shape in which the tubular blank 540 is captured. As seen in FIG. 5b, the round tubular blank 540 has been somewhat crushed and collapsed in an inward irregular manner during its forced placement into the box shape cavity of the lower die 500.

FIG. 5c shows the application of hydraulic pressure, to the interior of the blank 540, as indicated by arrows therein, to force the blank outwardly to its final shape. Once, the tubular blank reaches the predetermined shape via hydroforming, it is released from the mold and a hydroformed tube with a pentagonally shaped cross-section is achieved. The hydroformed tube has improved strength of conventionally shaped products as a result of the biaxial and/or triaxial orientation of the polymer molecules that make up the thermoplastic material.

In accordance with a further embodiment of the invention, the longitudinally oriented tubular blanks used for fluid forming can have various cross-sectional profiles. The instant invention is not intended to be limited to circular cross-sectional profiles of tubular blanks. Thus, tubular blanks for fluid forming in accordance with the instant invention are available in any cross-sectional shape, such as a circular, hexagonal or even randomly generated shapes.

Furthermore, in accordance with yet another embodiment of the instant invention, the cross-section of the fluidformed structural components does not need to be uniform along the length of the part. In addition, the wall thickness does not need to be uniform along the longitudinal direction of the fluidformed structural components.

In order to predict a wall thickness of the final hydroformed product, it is necessary to consider the expansion factor in each step. The following example is used to illustrate this more clearly. For example, a wall thickness of 25 mm for a tubular blank is reduced to a wall thickness of about 5 mm if the blank undergoes a longitudinal stretching of five times its original length, i.e. the tubular blank was expanded or stretched by an expansion factor of 5. The wall thickness of the tubular blank is further reduced to about 3 mm by a subsequent hydroforming process that stretches the tubular blank in a hoop direction, i.e. the expansion factor of the hydroforming step is about 1.5.

In accordance with the invention, the fluid forming of oriented thermoplastic materials is performed below the softening point of the respective thermoplastic polymer so as to maintain the longitudinal orientation of the thermoplastic material of the tubular blank employed in the fluid forming process and above the glass transition temperature to make the thermoplastic material of the tubular blank pliable.

Furthermore, in accordance with the present invention, an expansion ratio $E_1$ for the preparation of longitudinally oriented tubular blanks, and an expansion ratio $E_2$ for the fluid forming process to make biaxially and/or triaxially oriented structural components, are taken into consideration for determining a maximum amount of stretching of the respective thermoplastic material used in the preparation of the tubular blanks.

The increase in strength and modulus of the structural components in accordance with the instant invention is a function of the degree of stretching of the polymer molecules of the thermoplastic material. The degree of stretching in the longitudinal direction and the hoop direction can be tailored to a predetermined degree of stretching within the limits of stretchability of the thermoplastic material. However, by expanding a tubular blank in a longitudinal deformation direction and subsequently in a hoop direction, the increase in strength and modulus in the longitudinal direction is reduced by the expansion in the hoop direction because the number of polymer molecules in the thermoplastic material is limited. Thus, the mechanical properties of the structural components are "diluted" because of the finite number of polymer molecules. A draw ratio is established between the expansion ratio $E_1$ and the expansion ratio $E_2$. The strength and modulus of the manufactured structural components can be tailored by adjusting the degree of stretching in the longitudinal direction and the hoop direction.

Advantageously, structural components in accordance with the instant invention are strong and light weight and can be employed, for example, as crush cans, bumper beams, intrusion beams in vehicle doors, and frame members. Such energy management structures have been employed in vehicle frames or body panels in order to protect human beings by absorbing shocks upon collisions. Bumper beams or crush boxes, for example, are installed to the front and rear of vehicle frames in order to absorb shock energies when vehicles encounter a collision. Impact forces during the specified types of impacts are maintained just below a predetermined level by deforming the energy absorber and beam until the kinetic energy of the impact event has been absorbed. Crush cans provide the desired energy dissipation by folding inwardly such that the front section is driven into the second enclosed larger cross-section that forms the rear section.

Figure 6:
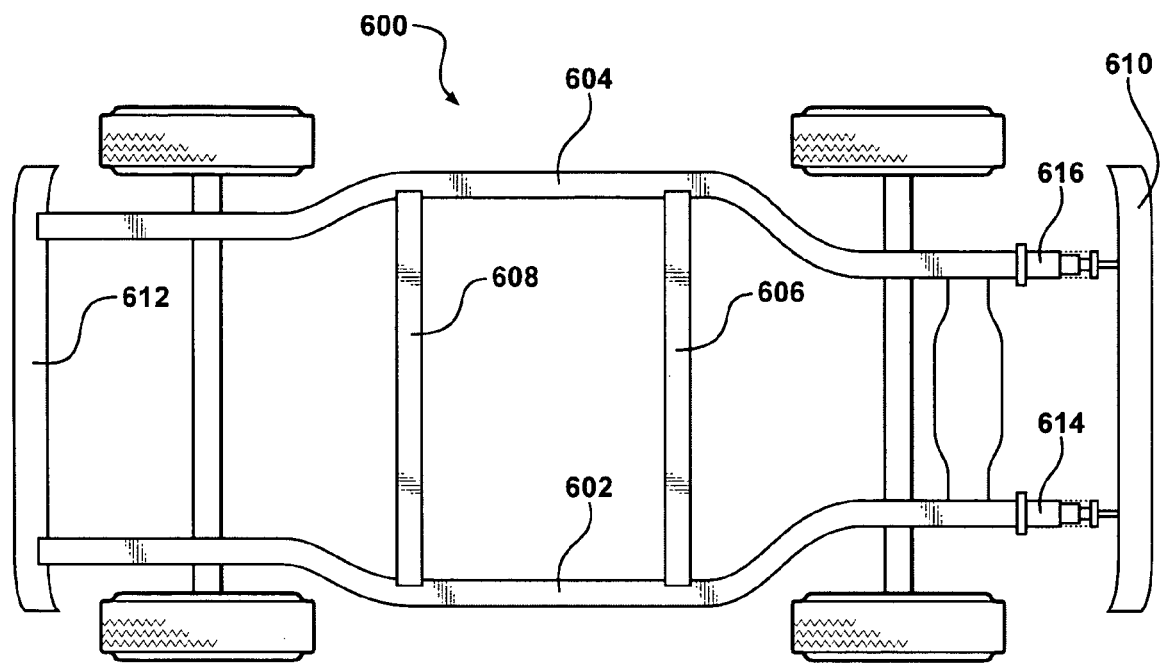
FIG. 6 shows a schematic top plan view of a vehicle frame employing crush cans in accordance with an embodiment of the invention.

FIG. 6 shows a schematic top plan view of a vehicle frame 600 including side rails 602 and 604, cross rails 606 and 608, front bumper 610, and rear bumper 612. Furthermore, frame 600 is shown to employ crush cans 614 and 616 in accordance with an embodiment of the invention. Crush cans 614, 616 are provided at a front end of frame 600 between side rail 602 and front bumper 610 and between side rail 604 and front bumper 610, respectively. If desired, crush cans are also provided at a rear end of frame 600 between side rail 602 and rear bumper 612 and between side rail 604 and rear bumper 612.

Advantageously, energy management structures in accordance with the invention can introduce crush zones into the vehicle with relative ease and relatively low cost while maintaining the structure stiffness and complexity of a vehicle.

In accordance with another embodiment of the invention, a space frame or portions thereof are made from biaxially and/or triaxially oriented components that have been prepared in accordance with the instant invention. Advantageously, frame components made in accordance with the invention provide a light weight alternative to metal frame components while maintaining a high structural integrity.

Figure 7:
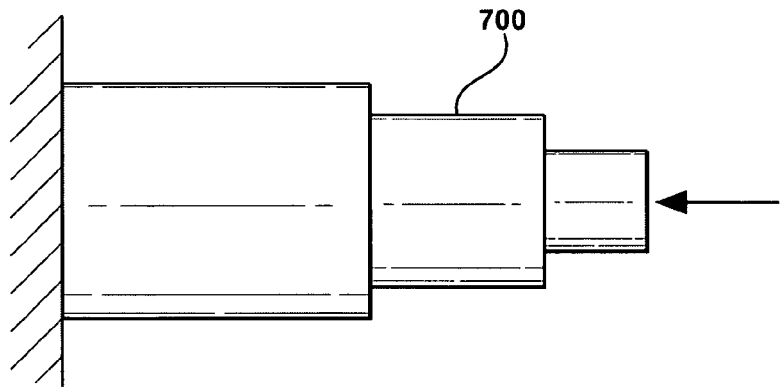
FIG. 7 shows a schematic drawing of an impacting force upon a crush can.
Figure 8:
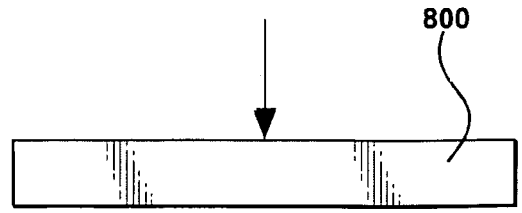
FIG. 8 shows a schematic drawing of an impacting force upon an intrusion beam.

Furthermore, as a result of the biaxial and/or triaxial orientation, structural components in accordance with the invention maintain their structural integrity independently upon the impact direction of a colliding force. FIG. 7 shows a schematic drawing of an impacting force, as indicated by an arrow, upon a crush can 700. In the case of a crush can the force impacts along a longitudinal direction of the structural component. FIG. 8 shows a schematic drawing of an impacting force, as indicated by an arrow, upon an intrusion beam 800. In the case of an intrusion beam the force impacts along a transverse direction of the structural component. Advantageously, the strength of structural components in accordance with the invention can be tailored in dependence upon the desired use of the prepared structural components. Thus, the strength of the structural components can be enhanced either in the longitudinal or transverse direction of the components.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. An energy management structure for use in a vehicle, made by
   providing a tubular blank comprised of a thermoplastic material, the thermoplastic material having uniaxial orientation of polymer molecules in a longitudinal direction of the tubular blank;
   placing the tubular blank into a cavity of a die mold, the die mold having an interior surface defining a shape of the cavity; and
   providing a fluid interiorly to the tubular blank with sufficient pressure so as to expand the tubular blank outwardly into engagement with the interior surface of the die mold to substantially conform the tubular blank to the shape of the cavity, wherein expansion of the tubular blank is carried out above the glass transition temperature and below the softening point of the thermoplastic material so as to orient the polymer molecules in at least one of a biaxial or triaxial orientation.

* * * * *